Sept. 9, 1930.  L. H. MOE  1,775,496
NONRISING STEM VALVE
Filed July 16, 1927
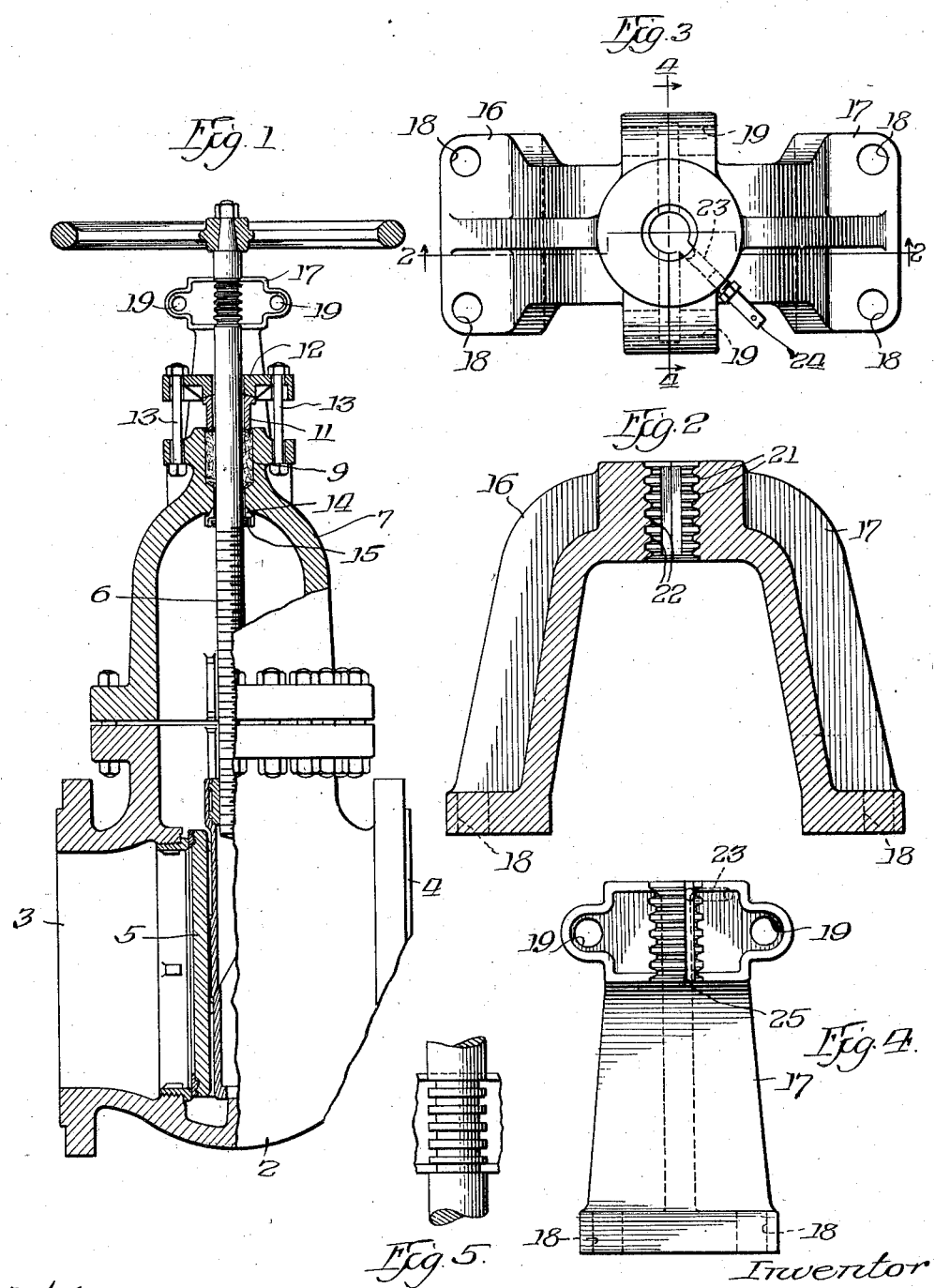
Inventor
Lawrence H. Moe
By Ira J. Wilson
Atty.

Patented Sept. 9, 1930

1,775,496

UNITED STATES PATENT OFFICE

LAWRENCE H. MOE, OF CHICAGO, ILLINOIS, ASSIGNOR TO CRANE CO., OF CHICAGO, ILLINOIS, A CORPORATION OF ILLINOIS

NONRISING STEM VALVE

Application filed July 16, 1927. Serial No. 206,201.

This invention pertains to valves of the non-rising stem type and more particularly to the provision of a thrust bearing for such type of valve.

All non-rising stem valves must of necessity be provided with some type of thrust bearing and it is quite usual for the body or bonnet of the valve as the case may be to be provided with a bearing shoulder against which a collar integral with or secured to the valve stem, engages for absorbing the thrust which occurs during the opening and closing movements of the valve. Various complicated thrust bearing arrangements have been provided but all of them are expensive and inaccessible to a greater or lesser extent. One of the cheapest and most satisfactory thrust bearing arrangements is that in which the body, cap or bonnet is provided with an interiorly opening recess circumferentially about the stem for the reception of a collar secured to or integral with the stem and threaded or otherwise arranged for the reception of a packing gland or thrust gland nut which ordinarily abuts against the side of the collar on the stem opposite the side of the collar abutting against the interior end of the recess.

With this specified arrangement it is preferable either (1) to weld the collar on the stem, (2) to heat and upset the stem at the place at which the collar is desired and thereby form the same, or, (3) to machine down an over-size stem from its opposite ends toward the place where the collar is desired. However, any one of these methods is expensive and often unsatisfactory and by reason of the location of the thrust bearing in the bonnet or body cap it is exposed to a greater or lesser degree to whatever fluids which may pass through the valve and their effects. Particularly detrimental is the effect of steam, acids and the like. Then too, although the valve bonnet or valve cap designs and arrangements are not particularly well suited for incorporation of thrust bearings, it has been deemed the most desirable and satisfactory arrangement so far devised.

I have devised an arrangement whereby all the difficulties and unsatisfactory features encountered with thrust bearing constructions and arrangements such as those above described may be entirely eliminated by simple, cheap and effective means which at the same time will have additional advantages and unique features, all forming a primary object of my invention.

Another object is to provide a novel type of thrust bearing for a valve stem of a valve of the character described which may be easily and conveniently lubricated and one which will retain lubrication for a longer period of time than valve stem thrust bearings heretofore constructed.

A further object is to provide a valve stem thrust bearing arrangement which may in a preferred form be made with a plurality of thrust shoulders to thereby reduce the normal load on each thrust bearing face.

Many further objects, the advantages and operation of the invention will be or should become readily appreciated after reading the following description and claims and after viewing the drawing in which:

Fig. 1 is a side elevation of a non-rising stem gate valve, partially in section, embodying my invention, Fig. 2 is a sectional elevation of one form of yoke having a thrust bearing constructed in accordance with the invention, taken on the line 2—2 of Fig. 3, Fig. 3 is a top plan view of such yoke, Fig. 4 is an elevational view of the interior side of the right hand half of the yoke, taken on the line 4—4 of Fig. 3, and Fig. 5 is a fragmentary detail of a modified type of thrust bearing arrangement.

The non-rising stem valve chosen for illustration of the invention includes a body generally designated 2 having ports 3 and 4 communication between which is established or cut off by gate members 5 (one only shown). The gate members are operated by a non-rising stem 6 which passes through a bonnet or cap 7 secured to the body by bolts and nuts 8 in the usual manner. The bonnet is provided with a packing recess 9 into which packing is first placed and thereafter compressed by a packing gland member 11 which in turn is forced downwardly by a compression plate member 12 adjustably connected to the bonnet by suitable bolts 13. A sealing cone 14 adapted to be wedged tightly between the stem and the bonnet 7 by engagement with the top of the valve gate member when the latter is raised is held in its position by a sealing abutment ring 15 preferably threaded onto the stem and secured by a set screw in its proper position.

Instead of making the stem 6 of oversize and then turning it down to provide a thrust bearing which would ordinarily be locked in a position just above the sealing cone 14 in a recess in the bonnet and instead of the other expensive and unsatisfactory method of forming a thrust bearing which consists in upsetting the stem to form a collar thereon at the place where it is desired, I utilize a stem originally of the size and diameter that is finally desired and groove the same at one or more places adjacent its top or outer end for the reception of corresponding rings or projections formed in a yoke member which embraces the stem. In the present instance the yoke member is made in two substantially identical halves 16 and 17 for convenience of manufacture and each of these halves is suitably bolted to lugs formed on the bonnet by bolts which pass through holes 18 as is well known.

The complementary halves 16 and 17 of the yoke are secured together by stud bolts or the like which pass through holes 19 and each is grooved with one or more comparatively shallow concentric grooves 21 so arranged that when the halves of the yoke are put together the complementary grooves will register with one another. When several grooves are formed rings or projections 22 are likewise formed between them and these projections or rings are so spaced, constructed and arranged that they will fit within the grooves formed circumferentially of the stem while the spaced rings or projections on the stem fit into the grooves formed in the yoke halves. In Figs. 1 to 4, inclusive, the thrust shoulders formed on the stem and yoke are shown slightly beveled whereas in Fig. 5 the cooperating thrust shoulders are shown square but as the shape of the thrust shoulders is a matter of design and may be varied to suit various conditions and circumstances no further reference to them will be made here. In Figs. 2 and 4 the yoke shown is provided with a grease or lubricant chamber or conduit 23 for supplying a lubricant to the thrust bearing and if desired may be supplied through the typical pressure greasing fitting 24. When heavy grease is to be supplied to the thrust bearing the thrust bearing in one side of the yoke may be longitudinally channeled as shown in 25 of Fig. 4.

Location of the thrust bearing in the yoke saves the thrust bearing from the detrimental action caused by steam, acid or any other gas or liquid passing through the valve. The lubricant will last longer and less power for operation will be required while the wear on the bearing surfaces is reduced substantially to a minimum. The arrangement also affords greater and easy access to the thrust bearing for it is no longer necessary to "cut out" the valve from the line while the thrust bearing is being inspected, etc.

With the arrangement which I have described a great saving in the manufacture of valve stems may be effected for, as has been noted above, machining the stem from a larger diameter to form the thrust bearing is quite expensive particularly where brass or bronze stems are required due to the high cost of the material which is wasted, and upsetting the stem to provide a thrust collar embodies a strain on the material, is costly and cannot be used commercially for non-ferrous materials without reducing the strength of the metal. On the other hand it is but a simple matter to machine the comparatively shallow grooves or rings in the stem and yoke members and where a plurality of rings and grooves are formed the several thrust shoulders receive the thrust and the wear is reduced thereby providing a thrust bearing of greater life. Furthermore, should the machining of the grooves and rings be slightly inaccurate where the thrust bearing is of the multiple ring and groove type a slight amount of wear will bring other thrust shoulders or surfaces into bearing engagement with one another so that the thrust will be equally distributed on all.

While I have illustrated and described what is at present a preferred form of my invention it will be appreciated that it is of broader application and for that reason I do not desire to be limited to the details of construction and arrangement shown merely for the purpose of illustrating the invention but only by the spirit of the invention and the scope of the appended claims.

I claim:

1. In a non-rising stem valve, a valve body, a closure member in said body, a valve stem member for moving said closure, a two-part yoke member secured to said body and embracing said stem, means for securing the parts of said yoke together about said stem, and a thrust bearing for said stem comprising a plurality of circumferential grooves in one of said members and a plurality of rings integral with the other of said members and projecting into said grooves.

2. In a non-rising stem valve, a valve body, a valve in said body, a stem connected with said valve, a stem supporting member secured to said body and having a portion spaced from said body, and means for holding said stem against substantial longitudinal movements while permitting its rotation comprising a plurality of interengaging rings and grooves formed on said stem and supporting member, said rings being respectively integral with said stem and supporting member and the rings on said stem being of the original diameter of the stem, the original diameter of said stem except for said grooves being unchanged.

3. In a non-rising stem valve, a valve body, a valve in said body, a stem connected with said valve, a two part stem supporting yoke member secured to said body and embracing said stem at a place spaced from said body, said yoke member parts having a plurality of complementary longitudinally spaced concentric rings and grooves at said place spaced from said body, and said stem having rings fitting the grooves in said yoke parts and grooves for receiving the rings on said yoke parts whereby said stem may be rotated without longitudinal movement.

In witness of the foregoing I affix my signature.

LAWRENCE H. MOE.